(12) United States Patent
Barak et al.

(10) Patent No.: US 7,182,872 B2
(45) Date of Patent: Feb. 27, 2007

(54) STRUVITE CRYSTALLIZATION

(75) Inventors: Phillip W. Barak, Madison, WI (US); Menachem E. Tabanpour, Brooklyn, NY (US); Mauricio Avila-Segura, Lahaina, HI (US); Juliane M. Meyer, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 74 days.

(21) Appl. No.: 10/710,686

(22) Filed: Jul. 28, 2004

(65) Prior Publication Data

US 2005/0023220 A1 Feb. 3, 2005

Related U.S. Application Data

(60) Provisional application No. 60/491,736, filed on Aug. 1, 2003.

(51) Int. Cl.
- B01D 11/00 (2006.01)
- B01D 63/00 (2006.01)
- C01B 15/16 (2006.01)
- C02C 25/01 (2006.01)

(52) U.S. Cl. .............. 210/638; 210/634; 210/903; 210/906; 423/306; 423/322; 423/DIG. 14; 119/173

(58) Field of Classification Search ........ 210/650–653, 210/97, 603, 630–631, 696, 638, 906, 195.2, 210/634, 903, 905, 605, 257.2; 423/331, 423/306, 322, DIG. 14; 71/15; 119/173
See application file for complete search history.

(56) References Cited

U.S. PATENT DOCUMENTS

| | | | |
|---|---|---|---|
| 4,685,420 A * | 8/1987 | Stuart ..................... 119/173 |
| 5,143,023 A * | 9/1992 | Kuhns ..................... 119/173 |
| 5,510,394 A | 4/1996 | Hodgon |
| 5,528,853 A * | 6/1996 | Dufaux et al. ............ 43/83.5 |
| 5,776,348 A * | 7/1998 | Selengut et al. .......... 210/698 |
| 5,928,853 A | 7/1999 | Yamamoto |
| 5,993,503 A * | 11/1999 | Kruidhof .................... 71/21 |

(Continued)

OTHER PUBLICATIONS

Abbona, F., et al., "Synthetic struvite, MgNH4PO4•6H2O: Correct polarity and surface features of some complementary forms," Acta Cryst. B40:223-227 (1984).

(Continued)

*Primary Examiner*—Ana Fortuna
(74) *Attorney, Agent, or Firm*—Godfrey & Kahn, S.C.

(57) ABSTRACT

The present invention provides a method and apparatus for removing phosphorus from phosphorus containing waste. In one embodiment, the method is preferably carried out by contacting the phosphorus containing waste with a noncellular membrane and precipitating phosphorus from the waste as struvite. Another aspect of the invention includes a method of removing phosphorus from phosphorus containing sewage comprising filtrates and biosolids. The removal of phosphorus as struvite occurs in two stages as primary and secondary removal. In the primary removal process, the sewage from a dewatering unit is contacted with a first polymeric membrane reactor and the phosphorus is removed as primary struvite. Subsequently Mg is added so as promote struvite formation and the secondary removal process of struvite. In the secondary removal process, the sewage from GBT Filtrate well or Centrifuge Liquor well is contacted with a second monomolecular membrane and the phosphorus is removed as secondary struvite.

32 Claims, 15 Drawing Sheets

U.S. PATENT DOCUMENTS

| | | | |
|---|---|---|---|
| 6,387,272 B2* | 5/2002 | Hirth et al. | 210/652 |
| 6,391,207 B1* | 5/2002 | Cluyse | 210/700 |
| 6,406,629 B1* | 6/2002 | Husain et al. | 210/605 |
| 6,485,645 B1* | 11/2002 | Husain et al. | 210/605 |
| 6,692,642 B2* | 2/2004 | Josse et al. | 210/605 |
| 6,733,662 B2* | 5/2004 | Pollock | 210/97 |
| 6,758,976 B2* | 7/2004 | Michalski et al. | 210/696 |
| 6,776,348 B2* | 8/2004 | Liu et al. | 235/492 |
| 6,884,355 B2* | 4/2005 | Kamiya et al. | 210/631 |
| 6,957,743 B2* | 10/2005 | Johnston et al. | 210/496 |
| 7,005,072 B2* | 2/2006 | Bowers et al. | 210/715 |
| 7,018,530 B2* | 3/2006 | Pollock | 210/194 |
| 7,052,581 B2* | 5/2006 | Winterson et al. | 162/181.2 |
| 2005/0023220 A1 | 2/2005 | Barak | |

OTHER PUBLICATIONS

Abbona, F., et al., J. Cryst. Growth 54:6-14 (1982).

Barak, P. 1990. SPECIES: A spreadsheet program for modeling speciation of soil solution. J. Agron. Educ. 19:44-46. (http://www.soils.wisc.edu/~barak/species.htm).

CEEP, Comite Europeen d'Etudes des Polyphosphates. Conference Summary; Second Int'l Conf. on the recovery of phosphorus from sewage and animal wastes. Noordwijkerhout, The Ne.

Gonzalez-Munoz, M.T., et al., "Struvite and calcite crystallization induced by cellular membranes of *Myxococcus xanthus*," J. Cryst. Growth 163:434-439 (1996).

Jaffer, Y., et al., "Potential phosphorus recovery by struvite formation," Water Research 36:1834-1842 (2002).

Liberti, L., D., et al., "REM NUT ion exchange plus struvite precipitation process." Environmental Technology 22:1313-1324 (2001).

Mann, S., et al., "Crystallization at inorganic-organic interfaces-biominerals and biomimetic synthesis" Science 261:1286-1292 (1993).

Mann, S., et al., "Controlled crystallization of CaCO3 under stearic-acid monolayers." Nature 334:692-695 (1988).

Ohlinger, K.N., et al., "Kinetics effects on preferential struvite accumulation in wastewater," J. Environ. Eng. 125:730-737 (1999).

Pierzynski, G.M., J.T. Sims., and G.F. Vance. 2000. Soils and Environmental Quality. 2nd ed. CRC Press, Boca Raton, London, New York, Washington D.C.

Rajam, S., et al., "Oriented crystallization of CaCO3 under compressed monolayers. Part 1.-Morphological studies of mature crystals," J. Chem. Soc.-Faraday Trans. 87:727-734.

Rawn, A.M., et al., "Multiple stage sewage digestion," Trans. Am. Soc. Civil Eng. 105:93-132 (1939).

Smith, R.M., adn Martell, A.E., "NIST critically selected stability constants of metal complexes," version 6.0. U.S. Dept. of Commerce, National Institute of Standards and Tec.

Tantinirundr, U. "Phosphorus removal in an aerobic supernatant by struvite crystallization without addition of chemicals." Master's thesis, University of Wisconsin, Madison (2.

Taylor, A.W., et al., "Solubility products of magnesium ammonium and magnesium potassium phosphates," Trans. Faraday Soc. 5(9):1585-1589 (1963).

* cited by examiner

STRUVITE CRYSTALLIZATION

Present Application seeks priority from U.S. Provisional application No. 60/491,736 filed on Aug. 1, 2003, which is incorporated in its entirety by reference for all purposes.

STATEMENT AS TO THE RIGHTS TO INVENTIONS MADE UNDER FEDERALLY SPONSORED RESEARCH AND DEVELOPMENT

This work was supported in part by grants from the United States Department of Agriculture-Cooperative State Research, Education and Extension Service 02-CHRF-0-6055, WISC-142-3879, and NASA Sharp Plus Program. The Government of the United States of America may have certain rights in this invention.

TECHNICAL FIELD

This invention generally relates to phosphorus recycling and specifically to methods for struvite crystallization.

BACKGROUND ART

Phosphate in water has been a growing environmental problem as a result of the increased amount of phosphate entering bodies of water from point and nonpoint sources. One specific problem related to waste phosphorus is eutrophication of water, i.e., "the enhancement of phytoplankton growth because of nutrient enrichment" (Pierzynski, et al., 2000). The eutrophication of bodies of water has many negative effects on the aquatic biome and can eventually lead to severe economic, environmental, and human health problems. An increase in the amount of phosphates in a body of water leads to the growth of aquatic weeds and algae (algae bloom). An algae bloom decreases the amount of oxygen in the water and decreases the visibility because of increased surface plant growth, which causes the elimination of bottom-dwelling plants and organisms. The use of the body of water is then discontinued for recreational purposes while cost of maintenance increases. The decreased amount of dissolved oxygen in water is a result of increased amount of microbial growth that feeds off of plant residues. A low level of dissolved oxygen leads to the decrease and elimination of many aquatic species (fish kill). Algae blooms and fish kills then cause odors and insect problems. In addition, the body of water becomes shallow and has limited movement (dead zone).

In some situations, algae blooms can result in human health hazards. Blue-green algae (cyanobacteria) naturally release toxins which in great amounts kill livestock and create a human health hazard. *Pfiesteria piscicida* is a dinoflaggellate that releases toxins that kills fish and causes lesions. Exposure to *Pfiesteria* causes symptoms of "headache, blurred vision, sores, reddening of the eyes, memory loss, and cognitive impairment" (Pierzynski et al., 2000).

Struvite (magnesium ammonium phosphate hexahydrate) is a naturally-occurring mineral found in manure and guano, as well in pathologies of urine and the renal tract. It has been a growing problem in wastewater treatment plants because of nucleation in unplanned locations resulting in crystal accumulation in pipes and flow reduction (Rawn et al., 1939). The removal of struvite crystals from pipes is very expensive. Currently, in order to eliminate the possibility of the precipitation of struvite and to reduce the amount of phosphates leaving in wastewater, iron and aluminum salts are intentionally added to precipitate the phosphate in wastewater.

Certain earlier methods of precipitating struvite either induced nucleation from supersaturated solutions with the presence of cellular membranes (Gonzalez-Munoz et al., 1996) or utilized kinetic energy added with high-speed propellers (Ohlinger et al., 1999). Since these methods are not particularly efficient, developing new methods to induce the nucleation of struvite can prove beneficial for controlling nucleation of struvite in wastewater treatment plants and reduction of the amount of phosphate entering bodies of water. Recovered phosphate in the form of struvite may be advantageously used as a slow release fertilizer because of its limited solubility and also merits an "organic fertilizer" designation because of its source.

Prior work with crystallization utilizing membranes has been in regard to the nucleation of calcium carbonate ($CaCO_3$). Monolayer films of stearic acid ($CH_3(CH_2)_{16}CO_2H$), octadecylamine ($CH_3(CH_2)_{17}NH_2$), octadecanol ($CH_3(CH_2)_{17}OH$), and cholesterol ($C_{27}H_{45}OH$) have been used under full and partial compression (Mann et al., 1993). Striking results have been obtained with inducing the oriented formation of vaterite, a rare polymorph of $CaCO_3$, in a system that otherwise crystallized calcite. Work with $CaCO_3$ has focused on the structural and stereochemical relationship between the monolayers and controlled nucleation of $CaCO_3$ using monolayers (Mann et al., 1993).

There exists considerable interest in recycling Phosphorus (P) as struvite based on philosophical, environmental, economic and commercial reasons. The European Union goal is to recover and recycle at least 25% of waste phosphorus. Moreover, declining phosphorus content of exploitable virgin ore in combination with the commercial value of struvite at, for example, $320/ton increases the desirability of alternate methods of production of struvite.

Following is a list of various pilot programs in different countries that have existing methods and techniques for removing and recycling phosphorus containing waste. A method used in one pilot program includes using fluidized beds with no addition of chemicals. In this method, however, there is an insufficient quantity of Magnesium (Mg) for proper struvite precipitation. Another method, such as that used in Treviso, Italy, includes using a combination of $Mg(OH)_2$ and NaOH to bring the Mg/P stoichiometric ratio to 1 and increasing the pH so that struvite is precipitated as pellets in fluidized bed reactors.

In Geestermerambacht, Netherlands, the process of phosphorus removal currently requires the initial removal of carbonates from treated liquors at pH 6, followed by addition of $Ca(OH)_2$ to raise the pH to 8–8.5 which causes phosphate precipitation. This method is however, environmentally and economically unattractive.

In a Japanese pilot program, seawater is used as a source of Mg for small Struvite recovery, while in another pilot project, also in Japan, pH of the liquor is adjusted using NaOH. In Sweden, the KEPRO® process is used in a pilot plant for recovery of iron phosphate from sewage. Ferric phosphate, however, produced in the KEPRO® process is not water soluble, and bioavailability of the resulting fertilizer is unclear. In yet another pilot program in the UK, pH is adjusted using $Mg(OH)_2$, which in turn also provided Mg for struvite precipitation.

Occasionally, $CO_2$ stripping is used to raise pH to obtain favorable conditions for struvite precipitation. However, microbial bodies commonly present in the waste sources of phosphorus produced $CO_2$ inevitably and constantly. This method is therefore not particularly effective. Additionally, such stripping does not raise the pH to desirable basic levels that favor struvite precipitation. Yet another method for obtaining struvite precipitation includes dosing the waste phosphorus with $MgCl_2$. Other basic compounds such as NaOH, MgO and $Ca(OH)_2$ have been used to raise the pH. However, these methods increase the salt load, which in turn increases the solubility of sparingly soluble salts contained in the waste, including struvite, which is undesirable for purposes of struvite recovery. Such additions also increase the cost of production. Occasionally, ion exchange resins are used to concentrate reactants such that struvite formation is favored. However, such systems require concentrated brine to strip resin columns, which also lead to reduced efficiencies and economies.

The earliest struvite recovery operation appears to be that of Unitika Ltd (Japan), which has had a "Phosnix" process operating since 1998 in Shimane Prefecture using $Mg(OH)_2$ and NaOH to precipitate struvite. This business has sold its product as a "boutique" fertilizer (Munch et al., undated), presumably as an "organic" or recycled fertilizer sold retail in small packages at prices of $300–800/ton (CEEP, 2001).

Probably the best economic analysis regarding P removal and recovery is that of a pilot plant designed for the Slough (UK) Sewage Treatment Works (Jaffer et al., 2002), which handles 520 kg P in 64,000 $m^3$ sewage per day, from a population of 250,000. Construction of a precipitation reactor was estimated at $27 k. To precipitate 42 to 99 tons of struvite per year would cost $86–$88 k per year. Almost all of the operating expenses were chemical costs; 97% of that cost was NaOH ($94/ton) to raise pH and the rest was $MgCl_2$ ($144/ton) to supplement the magnesium content of the wastewater. Revenues for sale of struvite (at $320/ton) produced were estimated to be $13–32 k, and therefore would cover one-third to one-half of the cost of struvite removal. According to Jaffer et al. (2002), "[c]osts of production have to be offset against the revenue lost through increased pumping costs, lost man hours, expensive pipe replacements, possible excavation work if pipes are located underground and STW downtime due to blockages." Clearly, reduction in chemical costs, mainly NaOH, would alter the financial balance. A full-scale reactor in Slough was under construction in 2001 (CEEP, 2001).

Additional struvite recovery plants include the Hiagari Sewage Treatment Plant in Kitakyushau City (Nishihara Corp., Ltd, Japan—NaOH), Osaka (Kurita Water Industries—NaOH and $MgCl_2$), and Oxley Creek, Brisbane, Australia (Brisbane—Water and $Mg(OH)_2$). In yet another process, aka, the REM NUT process (Liberti et al. 2001) phosphate and ammonium are accumulated from the effluent on ion exchangers, which are then stripped with brine, forcing struvite precipitation from the concentrated solution. Other related plants include a calcium phosphate recovery reactor (Geestmerambacht, The Netherlands) and iron phosphate recovery pilot plant (Helsingborg, Sweden). [CEEP, 2001].

Additional consideration has been given to struvite formation from manure lagoons, either in the presence of biosolids (which presents formidable problems of separating the struvite from the organic solids) or in filtrates after dewatering, at which point the nature of the chemical problem is similar to that of sewage treatment plants. Removal of P from the manure would better balance the N/P fertility needs of most crops and soils and better rationalize the application of high rates of manure (or biosolid) application for N fertility, without overapplying P.

The need exists, accordingly, for new methods of struvite crystallization such that phosphorus and other minerals may be recycled effectively, efficiently and economically.

SUMMARY OF THE INVENTION

The present invention provides a method of removing phosphorus from phosphorus containing waste. The process is preferably carried out by contacting the phosphorus containing waste with a non-cellular membrane and precipitating phosphorus from the waste as struvite. In a preferred embodiment, the non-cellular membrane is a "self-assembling monolayer" ("SAM"). The SAM may be formed through a mercapto-derivatized chalcophilic or siderophilic element compound. The chalcophilic or siderophilic element is selected from Cu, Ag, Zn, Cd, Ga, In, Tl, Pb, Hg, Bi, Au, Ge, Sn, Ni, Pd and Pt. Further, the mercapto-derivatized chalcophilic or siderophilic element compound is copper or gold derivatized mercapto-undecanoic acid. In a yet preferred embodiment, the mercapto-derivatized chalcophilic element compound is copper or gold derivatized mercapto-undecanoic acid, $[HS(CH_2)_{10}COOH]$. The struvite is therefore further nucleated as crystals on copper or gold derivatized mercapto-undecanoic acid, $[HS(CH_2)_{10}COOH]$.

The present invention also provides an apparatus for removing phosphorus from phosphorus containing waste as struvite. The apparatus, also termed a struvite reactor, includes a first chamber for containing phosphorus containing waste. A second chamber containing suitable ionic salts and solutions is further included and these chambers are separated using a non-cellular membrane which is suitable for cation exchange that favors struvite formation.

Another aspect of the invention includes a method of removing phosphorus from phosphorus containing sewage, particularly after anaerobic digestion of the primary sludge, comprising filtrates and biosolids. The sewage passes through a dewatering unit, such as a Gravity Belt Thickener (GBT) or centrifuge, and into a well containing the GBT Filtrate or the centrifuge liquor. The removal of phosphorus as struvite occurs in two stages as primary and secondary removal. In the primary removal process, the sewage from the dewatering unit is contacted with a first polymeric membrane reactor and the phosphorus is removed as primary struvite. Subsequently, Mg is added so as promote struvite formation and the secondary removal process of struvite. In the secondary removal process, the sewage from the GBT Filtrate or Liquor well is contacted with a second monomolecular membrane and the phosphorus is removed as secondary struvite.

Another embodiment of the present invention teaches a method of removing phosphorus, potassium, ammonium, magnesium, selenium or arsenic from waste containing phosphorus, potassium, ammonium, magnesium, selenium or arsenic. The method comprises the steps of: (a) contacting the waste with a non-cellular membrane; and (b) precipitating phosphorus, potassium, ammonium, magnesium, selenium or arsenic from the waste as struvite or analog thereof. Preferably, the non-cellular membrane is negatively charged and is organized as monolayers, micelles, lamellar bilayers or bilayer vesicles. In particular, the non-cellular membrane is a "self-assembling monolayer" ("SAM"). Further, the SAM is formed through a mercapto-derivatized chalcophilic or siderophilic element compound. In particular, the chalcophilic or siderophilic element is selected from Cu, Ag, Zn, Cd, Ga, In, Tl, Pb, Hg, Bi, Au, Ge, Sn, Ni, Pd and Pt. Further, the struvite analog is $MgKPO_4.6H_2O$, $MgNH_4AsO_4.6H_2O$, $MgNH_4SeO_4.6H_2O$, $KMgCl_3.6H_2O$, or $K_2Mg(SO_4)_2.6H_2O$.

Various other features, objects, and advantages of the invention will be apparent to those skilled in the art from the following detailed description including illustrative examples setting forth how to make and use the invention.

BRIEF DESCRIPTION OF THE DRAWINGS

FIG. 1, Abbona et al., 1984).

DISCLOSURE OF INVENTION

I. In General

Figure 1:
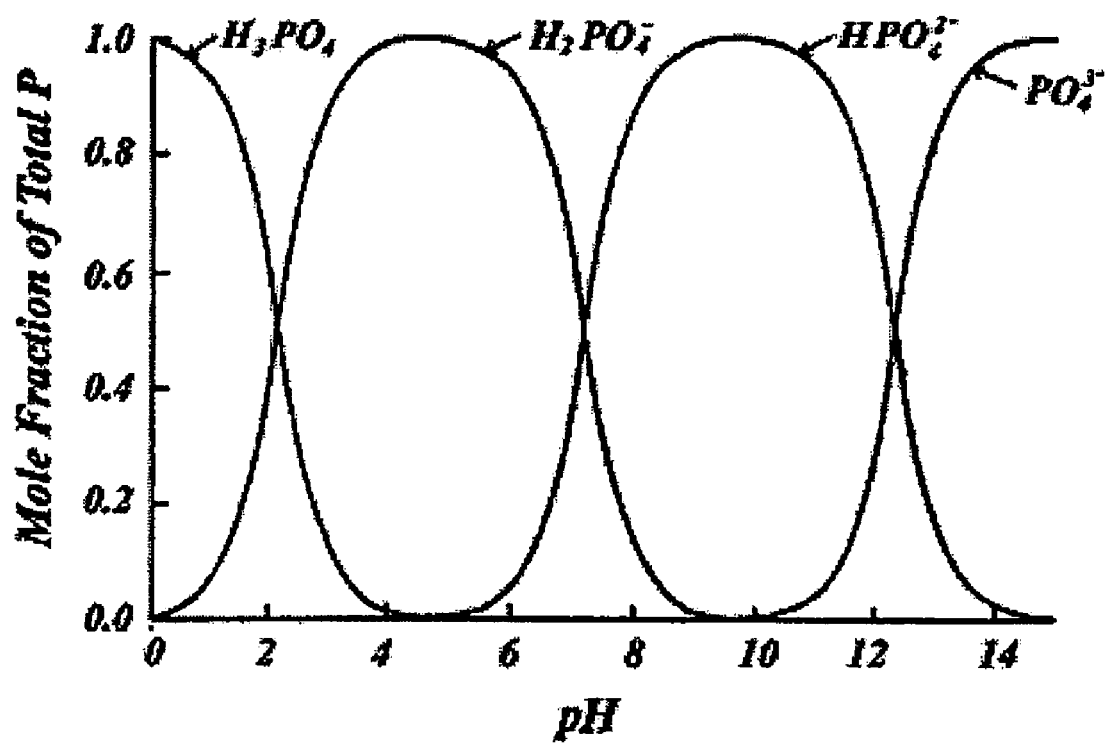
FIG. 1 illustrates the concentration of available phosphate under different pH. As pH increases more phosphate is available in solution. Inversely, the phosphate in solution serves as a buffer for keeping the solution at a desired pH level.

Before the present methods are described, it is understood that this invention is not limited to the particular methodology, protocols and reagents described, as these may vary. It is also to be understood that the terminology used herein is for the purpose of describing particular embodiments only, and is not intended to limit the scope of the present invention which will be limited only by the appended claims.

It must be noted that as used herein and in the appended claims, the singular forms "a", "an", and "the" include plural reference unless the context clearly dictates otherwise. Thus, for example, reference to "a membrane" includes a plurality of such membranes and equivalents thereof known to those skilled in the art, and so forth. As well, the terms "a" (or "an"), "one or more" and "at least one" can be used interchangeably herein. It is also to be noted that the terms "comprising", "including", "characterized by" and "having" can be used interchangeably. Unless defined otherwise, all technical and scientific terms used herein have the same meanings as commonly understood by one of ordinary skill in the art to which this invention belongs.

Although any methods and materials similar or equivalent to those described herein can be used in the practice or testing of the present invention, the preferred methods and materials are now described. All publications mentioned herein are incorporated herein by reference for the purpose of describing and disclosing the chemicals, instruments, statistical analysis and methodologies which are reported in the publications which might be used in connection with the invention. Nothing herein is to be construed as an admission that the invention is not entitled to antedate such disclosure by virtue of prior invention.

II. The Invention

One embodiment of the present invention includes a method of removing phosphorus from phosphorus containing waste. The process is preferably carried out by contacting the phosphorus containing waste with a non-cellular membrane and precipitating phosphorus from the waste as struvite. In a preferred embodiment, the non-cellular membrane is a "self-assembling monolayer" ("SAM"). The SAM may be formed through a mercapto-derivatized chalcophilic or siderophilic element compound. The chalcophilic or siderophilic element is selected from Cu, Ag, Zn, Cd, Ga, In, Tl, Pb, Hg, Bi, Au, Ge, Sn, Ni, Pd and Pt. Further, the mercapto-derivatized chalcophilic or siderophilic element compound is copper or gold derivatized mercapto-undecanoic acid. In a yet preferred embodiment, the mercapto-derivatized chalcophilic element compound is copper or gold derivatized mercapto-undecanoic acid, [HS(CH$_2$)$_{10}$COOH]. The struvite is therefore further nucleated as crystals on copper or gold derivatized mercapto-undecanoic acid, [HS(CH$_2$)$_{10}$COOH]. The resulting struvite crystallization occurs along the 001 plane, and has planes of Ammonium [1], Magnesium [2], and Phosphate [3] stacked in layers of 2-3-1-2-3-orientation.

In another embodiment, further phosphorus removal can be obtained by an optional step of adding ferric chloride to the phosphorus containing waste. Preferably, addition of ferric chloride should be done after struvite removal. Phosphorus containing waste typically includes biosolids such as dewatered sludge and manure, bioliquids, such as urine, water bodies, such as oceans, seas, lakes, ponds and rivers, other solutions, colloids and precipitates that have some form of phosphorus contained in them. However, one of ordinary skill in the art can envision phosphorus containing waste from a wide variety of well-known sources.

In one preferred embodiment of the invention, non-cellular membranes that are used to cause precipitation of struvite are monomolecular membranes capable of forming micelles, lamellar bilayers or bilayer vesicles. Compressed Langmuir monomolecular membranes are typically composed of hydrophobic linear, saturated acyl chains of 8 to 24 carbons in length. In another embodiment, saturated acyl chains of 18 to 20 carbons in length with hydrophilic head groups are used. Head groups suitable for use in the invention include carboxylate (e.g., stearic acid), sulfate (—C—O—SO$_3$, e.g., stearyl sulfate), phosphate (—C—O—PO$_3$, e.g., stearyl phosphate), sulfonate (—C—SO$_3$), phosphonate (—C—PO$_3$, e.g., stearyl phosphonate), stearyl perflourosulphonate and alcohol (e.g., stearyl alcohol; which do not appreciably ionize at usable pH values and are not expected to form a usable negatively-charged membrane). Closely related, biomembranes typically contain carbon chains 8 to 24 carbons long, which may be saturated, unsaturated, or even coupled, usually esterified with glycerol and organized into micelles, lamellar bilayers, and bilayer vesicles.

In another preferred embodiment of the present invention, a polymeric membrane is used to precipitate phosphorus as struvite. The polymeric membrane includes negatively charged carboxylate, sulfate, sulfonate, phosphate, phosphonate, alcohol and combinations thereof, embedded in a nylon or acrylic membrane.

In yet another preferred embodiment of the present invention, in order to obtain struvite crystallization efficiently, the phosphorus containing waste has a pH between 7 and 14. The pH is 8 to 10 in a still more preferred embodiment.

In another aspect of the invention, an apparatus is used for removing phosphorus from phosphorus containing waste. In one preferred embodiment, the apparatus, also termed a struvite reactor, includes a first chamber for containing phosphorus containing waste. A second chamber for containing suitable ionic salts and solutions is further included and these chambers are separated using a membrane. This membrane is held in position and sealed using O-rings between the first and second chamber. Additionally the membrane is suitable for cation exchange and includes use of membranes polymeric acrylic membrane containing functional groups such as sulfonic acids, carboxylates, sulfates, sulfonates, perfluorosulfonates, phosphates, phosphonates and alcohols. Further, in another preferred embodiment, suitable ionic salts and solutions include MgCl$_2$, MgO, Mg(OH)$_2$, Mg(O$_2$CCH$_3$)$_2$ and MgSO$_4$.

There are various mechanisms by which this apparatus is used effectively as a struvite reactor. In one preferred embodiment, the apparatus is kept in a calm status quo ("static") environment and no fresh phosphorus containing waste or ionic salts and solutions are added. In another preferred embodiment fresh phosphorus containing waste and fresh ionic salts are added. This addition may be optionally made in form of countercurrents in the first and second chambers. The countercurrents are created when the direction of addition of fresh phosphorus containing waste is opposite to the direction of addition of fresh ionic salt and solutions. In yet another preferred embodiment, fresh phosphorus containing waste and spent ionic salts and solutions are added at a first end and substantially struvite stripped phosphorus containing waste and fresh ionic salts and solutions are added at an opposing end to form a multistage reactor.

Another aspect of the invention includes a method of removing phosphorus from phosphorus containing sewage comprising filtrates and biosolids. In one preferred embodiment, the sewage passes through a dewatering unit, such as a Gravity Belt Thickener (GBT) and GBT Filtrate well or Centrifuge and Centrifuge Liquor well. The removal of phosphorus as struvite occurs in two stages as primary and secondary removal. In the primary removal process, the sewage from GBT is contacted with a first polymeric membrane reactor and the phosphorus is removed as primary struvite. In the secondary removal process, the sewage from GBT Filtrate well is contacted with a second monomolecular membrane and the phosphorus is removed as secondary struvite. Additional phosphorus may be removed from the sewage biosolids by contacting biosolids with ferric chloride and precipitating phosphorus from them.

Once the sewage filtrate had undergone treatment in the polymer-membrane-based reactor and Mg has been added to make the solution supersaturated with struvite, the Mg-enriched solution could be subsequently treated with the monomolecular membrane in a tank (as in the GBT filtrate well), to complete the stripping of struvite from solution.

In another preferred embodiment, the first polymeric membrane includes a negatively charged nylon polymeric membrane or a negatively charged acrylic polymeric membrane. In yet another embodiment, the second monomolecular membrane is comprised by a stearic acid membrane, stearyl sulfate membrane, stearyl sulfonate membrane, stearyl phosphate membrane, stearyl phosphonate membrane or stearyl alcohol membrane, or related compounds differing in chain length and composition.

Another embodiment of the present invention teaches a method of removing phosphorus, potassium, ammonium, magnesium, selenium and/or arsenic from waste containing phosphorus, potassium, ammonium, magnesium, selenium or arsenic. The method comprises the steps of: (a) contacting the waste with a non-cellular membrane; and (b) precipitating phosphorus, potassium, ammonium, magnesium, selenium or arsenic from the waste as struvite or analog thereof. Preferably, the non-cellular membrane is negatively charged and is organized as monolayers, micelles, lamellar bilayers or bilayer vesicles. In particular, the non-cellular membrane is a "self-assembling monolayer" ("SAM"). Further, the SAM is formed through a mercapto-derivatized chalcophilic or siderophilic element compound. In particular, the chalcophilic or siderophilic element is selected from Cu, Ag, Zn, Cd, Ga, In, Tl, Pb, Hg, Bi, Au, Ge, Sn, Ni, Pd and Pt. Further, the struvite analog is $MgKPO_4 \cdot 6H_2O$, $MgNH_4AsO_4 \cdot 6H_2O$, $MgNH_4SeO_4 \cdot 6H_2O$, $KMgCl_3 \cdot 6H_2O$, or $K_2Mg(SO_4)_2 \cdot 6H_2O$.

Certain examples and preferred embodiments of the present invention are described below. However, these embodiments and examples are for illustrative purposes only and should not deemed to limit the scope of the present invention.

EXAMPLE I

One preferred embodiment of the present invention included a method of struvite recovery from phosphorus-rich solutions is based the inventor's discovery that (i) negatively-charged membranes induce directed and accelerated formation of relatively large struvite crystals on the membrane surface from struvite-supersaturated solutions, and (ii) when the membranes have appropriate selective permeability (as in the case of the polymeric sulfonate-type membranes the inventors used), those component ion(s) initially deficient for struvite formation can be supplied by ion transport across the membrane from a separate reservoir of the component salt(s), without increasing the salt content (and increasing struvite solubility) of the solution being treated, by compulsive ion exchange. This is compulsive because the removal of magnesium and/or ammonium from solution by struvite precipitation favors the desired exchange of ions.

The inventors have determined that membranes comprising monomolecular stearate or polymer membranes with sulfonic functional groups will advantageously induce struvite precipitation. Nucleation apparently occurs as a result of the negatively charged headgroups of stearate or sulfonate attracting and locally concentrating the Mg.

Initial experiments were performed using solutions under supersaturated conditions in order to induce crystallization thus creating struvite crystals. Test solutions were equal in concentration of ammonium ($NH_4$), magnesium (Mg), and phosphate ($PO_4$) and at pH of 7.5, buffered with the phosphate by using a mixture of $KH_2PO_4$ and $K_2HPO_4$. Using literature values for struvite solubility (Taylor et al,. 1963) and the chemical speciation program SPECIES (Barak, 1990), it was determined that struvite is saturated at 4.12 mM of $NH_4$ as $(NH_4)_2SO_4$, Mg as $MgSO_4$, and $PO_4$ as $(K_xH_{x-3}PO_4)$ at pH 7.5. Stock solutions were made at 0.5 M using analytical grade reagents and nanopure water (18Ω).

Induction time of unnucleated solutions: The first experiments involving the nucleation of struvite were measured for the induction time of crystal formation from various supersaturated solutions. Solutions of x1 (=4.12 mM Mg, $NH_4$, and $PO_4$), x1.5, x2, x4, x6, x8, x16, and x32 the concentration of the saturated solution were put together, using 15 mL of solution made up with nanopure water in 60 mL conical test tubes. The supersaturated solutions were prepared by first adding the water by weight and then adding the salts by pipette (Gilson Pipetman micropipetter). The order of adding the salts is important because when the Mg was added first it precipitated; therefore the order of adding the salts used was: ammonium, phosphate, (vortexing to mix), and then magnesium last. The time of nucleation with the more supersaturated solutions of x81, x32, and x16 were taken using a stopwatch because of their almost immediate nucleation.

Stearic acid membrane: Following the successful formation of struvite, experiments were then performed using stearic acid (Sigma, 99%) as a compressed monolayer membrane. A x4 solution was used as the main focus of our experiment because the unnucleated induction time was about one day; therefore it would clearly show a difference if the membrane successfully accelerated precipitation. A solution was made using 10 mL of chloroform to dissolve 10 mg of stearic acid (since stearic acid is not soluble in water). The solutions were combined in a 9.1-cm diameter Petri dish with 30 mL of solution at saturations of x2, x4, and x81. The monolayer was made by adding 16.56 μL of the stearic acid/chloroform mixture using a 25-μL chromatography syringe (Dynatech) to achieve the limiting area for each stearate molecule, 24 $Å^2$ (Rajam et al., 1991). The Petri dish was then left uncovered in a fume hood for five minutes so that the chloroform would evaporate then covered. The x81-saturated solution was used to see the structural relationship between the crystals with and without the membrane under the microscope. Two controls were established: one solution had no membrane to see the difference in induction time and another with chloroform to make sure that it alone is has no effect on crystallization.

Compressed Langmuir monomolecular membranes: These are typically composed of hydrophobic linear, saturated acyl chains of 8 to 24 carbons in length. Saturated acyl chains of 18 to 20 carbons in length, with a hydrophilic head groups are also used. Known head groups include carboxylate (e.g., stearic acid), sulfate (—C—O—$SO_3$, e.g., stearyl sulfate), phosphate (—C—O—$PO_3$, e.g., stearyl phosphate), sulfonate (—C—$SO_3$), phosphonate (—C—$PO_3$, e.g., stearyl phosphonate) and alcohol (e.g., stearyl alcohol; which do not appreciably ionize at usable pH values and are not expected to form a usable negatively-charged membrane). Closely related, biomembranes typically contain carbon chains 8 to 24 carbons long, which may be saturated, unsaturated, or even coupled, usually esterified with glycerol and organized into micelles, lamellar bilayers, and bilayer vesicles.

Polymer membranes: The cation exchange membrane used in the inventors' experiments apparently derives its exchange properties from strong acid sulfonic functional groups (CR 67, Ionics, Inc., Watertown, Mass.). According to the manufacturer's specifications, this material is an exchange polymer in an acrylic fabric with specific weight of 13.7 g $cm^2$, 0.6 mm total thickness and 2.1 $mmol_c$ $g^{-1}$ dry resin. The water content of wet membranes is ~40% (Ionics, Inc.; Watertown, Mass.). In this experiment, a 5-$cm^2$ strip of the polymer was added to 30 mL of solution in a conical 60-mL test tube. The membrane was first conditioned in 10 mL of a 1:1:1 modified mixture of stock solutions (magnesium sulfate, ammonium sulfate, and potassium chloride; the chloride replaced the phosphate so that the solution would exchange cations and not crystallize) three times. The strips were then conditioned two times in a modified x4 solution, ten minutes each time; the strips were then blotted dry on chemical tissues. The reason for conditioning the membranes is to match the cation composition of the membranes with that of the membranes at equilibrium with the supersaturated solutions; because the cation exchange membranes as received were saturated with sodium, thus when added to salt solutions, the solution Mg would replace the exchangeable sodium because of its higher charge and the solution would be deficient in Mg and undersaturated with respect to struvite. After the polymers were conditioned, they were added to the 30 mL solution of the salts. In this experiment, the inventors used three x2 and x4 solutions, one of each without a membrane to serve as a control.

Results from chemical speciation program:Calculations were made using the chemical speciation program in order to keep the pH of the solutions at 7.5. The pH is an important consideration in the inventors' experiments because the crystallization of struvite depends on the pH. As the pH increases, more phosphate is in the form of $PO_4^{3-}$ and is available for crystallization, which is schematically depicted in FIG. 1. In solutions, as the supersaturation increased, the pH decreased as a result of more phosphate that was removed from solution during crystallization. The measurement of pH after crystallization came close to the calculated pH without crystallization with respect to supersaturation. Table 1 illustrates calculated measurement of pH without precipitation on left vs. measured pH after precipitation on right.

Concentration of available phosphate increases with increase in pH. Inversely the phosphate in solution serves as a buffer for keeping the solution at a desired pH level.

| Degree of supersaturation | Mg (molar) | K (molar) | Calculated pH (Theoretical) | Measured pH (Experimental) |
|---|---|---|---|---|
| X1  | 0.00412 | 0.0079 | 7.5   | 7.60 |
| X2  | 0.00824 | 0.0158 | 7.27  | 7.69 |
| X4  | 0.01648 | 0.0316 | 6.965 | 7.32 |
| X8  | 0.03296 | 0.0632 | 6.6   | 6.28 |
| X16 | 0.06592 | 0.1264 | 6.15  | 5.88 |
| X32 | 0.13184 | 0.2528 | 5.33  | 5.56 |

Figure 2:
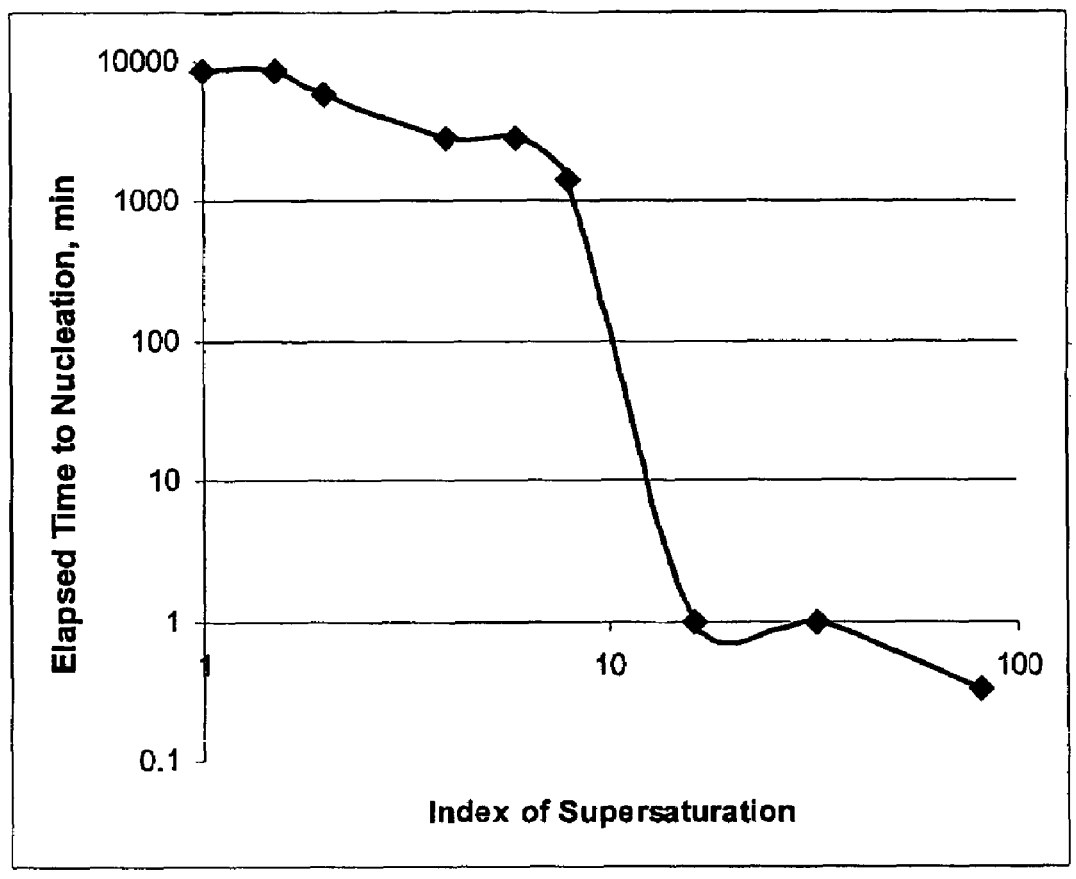
FIG. 2 illustrates the induction time for struvite crystallization without membranes—an inverse relationship exists between degree of supersaturaton and time of nucleation.
Figure 3:
FIG. 3 illustrates that in absence of a membrane, uncontrolled growth of crystal occurs such that the crystals have no particular shape or form and grow on top of each other, in no particular direction.

Induction time of unnucleated solutions: As shown in FIG. 2, measurement of induction time was an important part of the experiments. In the solutions, the higher the saturation the more quickly the crystals formed and as saturation decreased the time of nucleation increased. The absence of a membrane, however, resulted in uncontrolled growth of the crystals. In addition, the crystals have no particular shape or form and grow on top of each other in no particular direction, as shown in FIG. 3. The crystals were hard to bring to focus under the microscope because of multiple crystals growing in many directions.

Figure 4:
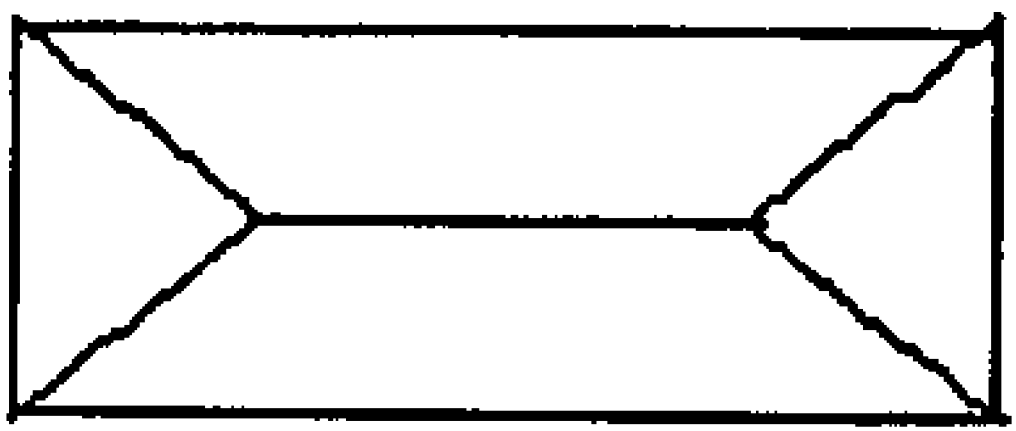
FIG. 4 illustrates that crystallization under stearic acid monolayer with the x4-supersaturated according to the invention occurred about 24 hours before the control, and the crystals were very symmetrical and contained florets with crystals growing in various directions.
Figure 5:
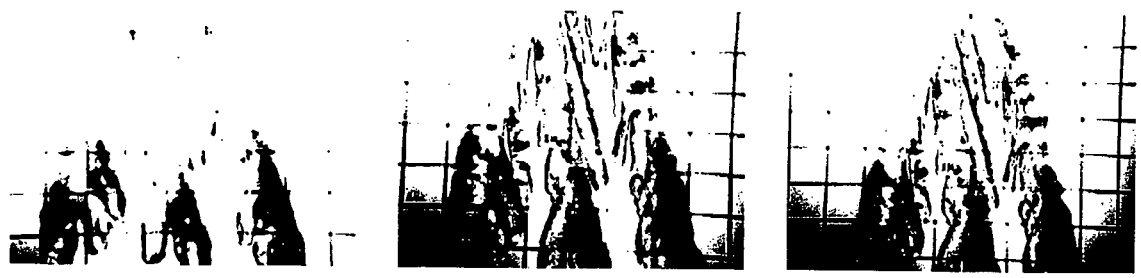
FIG. 5 illustrates a 3D image of the florets. Since the microscope cannot focus on all points at once, FIG. (5a) shows the face of the crystal, (5b) is focused on the middle of the crystal, and (5c) is focused on the rear of the crystal.
Figure 6A:
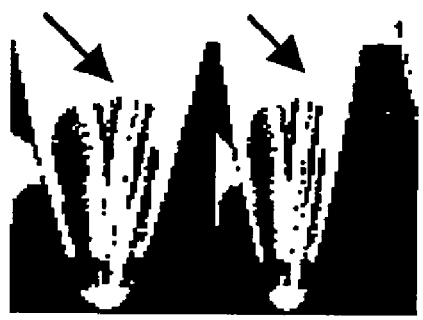
FIG. 6 illustrates one embodiment of the present invention in which nucleation under polymer membranes in x4 solutions occurred within 24 hours. Some of the crystals were seen on the membrane itself (FIG. 6a) while others were along the wall of the test tube because once one crystal forms, it induces further nucleation. The crystals seen in the test tubes were observed as symmetrical under the microscope (FIG. 6b). In the same solutions, large florets could be seen along the walls of the test tube.
Figure 6B:
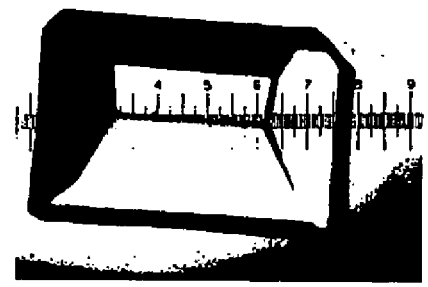

Stearic acid membrane: Crystallization under the stearic acid monolayer with the x4-supersaturated was observed about 24 hours before the control. The induction time for this experiment is relatively accurate because when the crystals were first seen they were fairly small, which means they recently nucleated. The longer the solution sat, the larger the crystals grew. Under the microscope, as shown in FIGS. 4 and 5, the first observation was that the crystals were very symmetrical and the second observation was florets, i. e., a nucleation center with crystals growing out in various directions.

As a result of the experiments described herein, the inventors have demonstrated that struvite will nucleate and crystallize faster under stearate and polymer membranes. The membranes have proven to cut the time of nucleation by at least half. The invention further encompasses a system of chambers may be used where struvite crystals will efficiently precipitate for collection. In practice, one of ordinary skill in the art can envision a scaled-up industrial version of this methodology for use in wastewater and manure treatment process for effective removal of phosphorus from phosphorus containing waste.

EXAMPLE II

In another preferred embodiment of the present invention, the inventors have further discovered that struvite formation from supersaturated solutions may be accelerated and directed by use of negatively-charged membranes. In particular, sulfonate-type cation membrane were tested and found suitable. These findings were made in pure solutions consisting of dissolved magnesium, ammonium, phosphate, present in stoichiometric ratios, and in the presence of potassium and sulfate as background electrolytes.

The utility of this discovery was examined in a continuous struvite recovery process in wastewater treatment. The inventors determined: (1) the ability of negatively-charged membranes to accelerate and direct struvite formation from solutions resembling those of the most likely locations of application in a working treatment plant; and (2) the ability of the negatively-charged membrane to supply magnesium across the membrane from a larger reservoir of magnesium chloride, forming struvite at the plane of contact between the membrane and the sewage solution.

Wastewater Samples and Analyses: The inventors visited the Nine Springs Wastewater Treatment plant, Madison, Wis. (Metropolitan Sewer District; MMSD) and identified potential locations within a wastewater treatment process for directed struvite crystallization. Problems related to undesirable struvite formation occurred in pipes, valves, and pumps, particularly around the GBT. Samples taken from the MMSD treatment facility were initially taken in glass test tubes, capped, refrigerated upon return to the lab, and subsequently centrifuged at 5000 rpm for ten minutes. Sample pH and EC were measured and then analyzed for major elements (Ca, Mg, Na, K, P, and S) by ICP-OES, $NH_4$—N and $NO_3$—N by rapid flow injection (Lachat), and chloride by electrometric titration with silver. The resulting chemical analyses were used as input for SPECIES (Barak, 1990), a chemical speciation program that calculates ion activities, ion pairs, and ion activity products (IAP) for minerals of interest.

Synthetic GBT filtrate: For aesthetic reasons and to improve reproducibility, during preliminary experiments inventors prepared synthetic solutions closely resembling MMSD wastewater samples for struvite recovery experiments. Assuming that all unassayed anions were organic anions, most likely acetate and propionate, the inventors constructed the following solution: 0.2 mM $MgSO_4$, 1.1 mM $Ca(Oac)_2$, 11.9 mM NaCl, 36.2 mM $NH_4OAc$, 4.0 mM $K_2CO_3$, 1.2 mM $KH_2PO_4$, 1.9 mM $(NH_4)_2PO_4$, and 3.5 mM $NH_4H_2PO_4$; unadjusted pH was 7.37. (For ease of preparation, the magnesium sulfate and calcium acetate solutions were prepared as two separate x1000 stock solutions and the remaining components were prepared as a single x50 stock solution.)

Figure 7:
FIG. 7 illustrates one embodiment of the present invention as a membrane-based reactor, in which a Plexiglas double chamber system, 10 cm i.d×15 cm, was used with synthetic Gravity Belt Thickener (GBT) filtrate separated from 0.5M $MgCl_2$ by a circle of cation exchange membrane, held in place and sealed with o-rings.

Struvite reactor: As shown in FIG. 7, a Plexiglas double chamber system, 10 cm i.d×15 cm, was used with synthetic GBT filtrate separated from 0.5M $MgCl_2$ by a circle of cation exchange membrane, held in place and sealed with o-rings. The cation exchange membrane used derives its exchange properties from strong acid sulfonic functional groups (CR 67, Ionics, Inc., Watertown, Mass.). According to the manufacturer's specifications, this material is an exchange polymer in an acrylic fabric with specific weight of 13.7 g $cm^2$, 0.6 mm total thickness and 2.1 $mmol_c$ $g^{-1}$ dry resin. The water content of wet membranes is ~40% (Ionics, Inc.; Watertown, Mass.). In house measurements showed a cation exchange capacity of ~0.062 $mmol_c$ $cm^{-2}$. Before use, membranes were soaked three times in 0.5 M $MgCl_2$ and rinsed exhaustively in deionized water to remove excess salts.

Dual chamber reactor, with synthetic filtrate (from the anaerobic digester; Gravity Belt Thickener, GBT, filtrate composition) and magnesium chloride solution, separated by the sulfonate-type cation exchange membrane, produced large (up to 3-mm in length) struvite crystals on the membrane.

Figure 8:
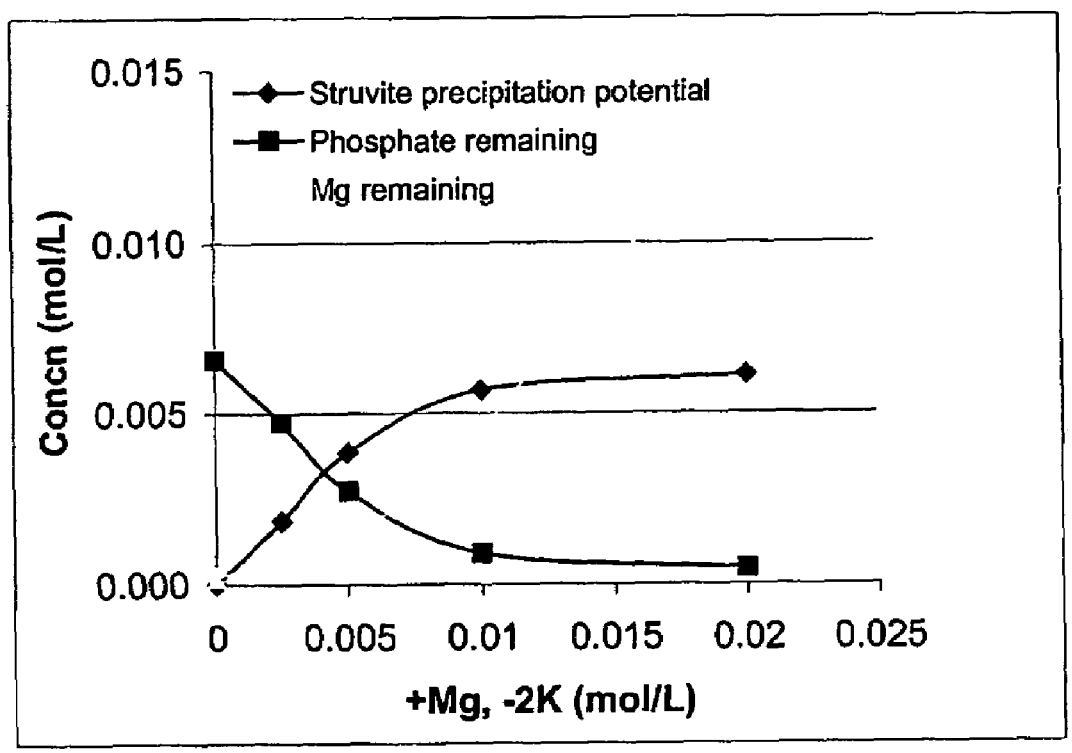
FIG. 8 illustrates graphically that a GBT filtrate was largely a solution of NaCl and $NH_4OAc$, with 204 ppm P, 604 ppm $NH_4$—N, 5 ppm Mg, pH 7.22, and EC 6.6 dS/m. The struvite precipitation potential was nil in the absence of added Mg, but calculations using the SPECIES program show that increasing amounts of Mg substituted for $K^+$ (or $NH_4$, Na, or Ca) increased the struvite precipitating potential to 90% of its maximum at ~10 mM added Mg, at which point approximately half was residual in the struvite-stripped solution.

Of the eight MMSD samples analyzed, gravity belt thickener (GBT) filtrate was the closest to saturation with struvite [$IAP_{struvite}=(Mg^{2+})(NH_4^+)(PO_4^{3-})=10^{-13.67}$; i.e., undersaturated with respect to struvite using $KSP_{struvite}=10^{-13.15}$, Taylor et al. (1963)] but was slightly (~x3) undersaturated. This could have been the result of dilution of the filtrate with the wash water used to clean the conveyor belt or the result of retention of struvite, ferric phosphate (formed by addition of ferric chloride to the waste stream), or brushite (dicalcium phosphate dihydrate) in the biosolids retained on the conveyer belt. As depicted in FIG. 8, the GBT filtrate was largely a solution of NaCl and $NH_4OAc$, with 204 ppm P, 604 ppm $NH_4$—N, 5 ppm Mg, pH 7.22, and EC 6.6 dS/m. The struvite precipitation potential was nil in the absence of added Mg, but calculations using SPECIES show that increasing amounts of Mg substituted for $K^+$ (or $NH_4$, Na, or Ca) increased the struvite precipitating potential to 90% of its maximum at ~10 mM added Mg, at which point ~half was residual in the struvite-stripped solution. As noted, a synthetic solution closely resembling the GBT filtrate was used in subsequent experiments.

In the struvite reactor, crystallization on the GBT filtrate side of the cation exchange membrane was observed after 4 hrs, although crystallization may have begun earlier. (The initiation and kinetics of struvite formation were difficult to observe since this is a white-on-white observation and the most desired oblique viewing angle was obscured by the reactor construction.) When opened after 16 hrs, several crystals, up to 3 mm in length, were clearly visible on the membrane. A number of much smaller, dust-sized crystals were also observed in the filtrate solution. A quick measurement of residual phosphate concentration in the synthetic filtrate indicated >50% removal of P; this measurement was made colorimetrically and without matrix matching, so its accuracy is uncertain without replication and refinement.

The formation of struvite in the reactor is an extension of the inventors' earlier findings that formation of such crystals are favored by the negatively-charged sites of a membrane, presumably because the localized accumulation of $Mg^{2+}$ overcomes the activation energy required for nucleation and crystallization. Unlike the inventors' previous experimental configuration, the use of a magnesium chloride reservoir in the reactor permits the recharge of the membrane with Mg diffusing across the membrane and would permit continuous operation. Further, the inventors noted that supply of $Mg^{2+}$ by ion exchange against the dominant cations in the GBT filtrate ($Na^+$ and $NH_4^+$) is not favorable because of preferences of ion exchangers for ions with higher ionic charge; the ion exchange occurring is likely compulsive ion exchange forced by the removal of Mg from solution by precipitation as struvite, followed by back diffusion of a monovalent cation across the membrane. This process of compulsive exchange will in effect be a self-dosing mechanism with respect to $MgCl_2$ consumption by struvite crystallization. The inventors also observed that it is generally preferable to add Mg while removing other cations, thereby keeping total ionic strength constant, rather than directly adding $MgCl_2$ and thereby increasing ionic strength of the solution, reducing the activity coefficients of Mg, $NH_4$, and $PO_4$, and increasing the solubility of struvite in the treated solution.

This benchtop configuration, as shown in FIG. 7, demonstrated additionally that directed struvite crystallization on a negatively-charged membrane was useful in real world solutions, containing significant concentrations of ions that could have potentially competed with or poisoned struvite formation on the membrane. Similar methodology for production of struvite can be scaled-up for industrial application, by one of ordinary skill in the art.

Figure 9:
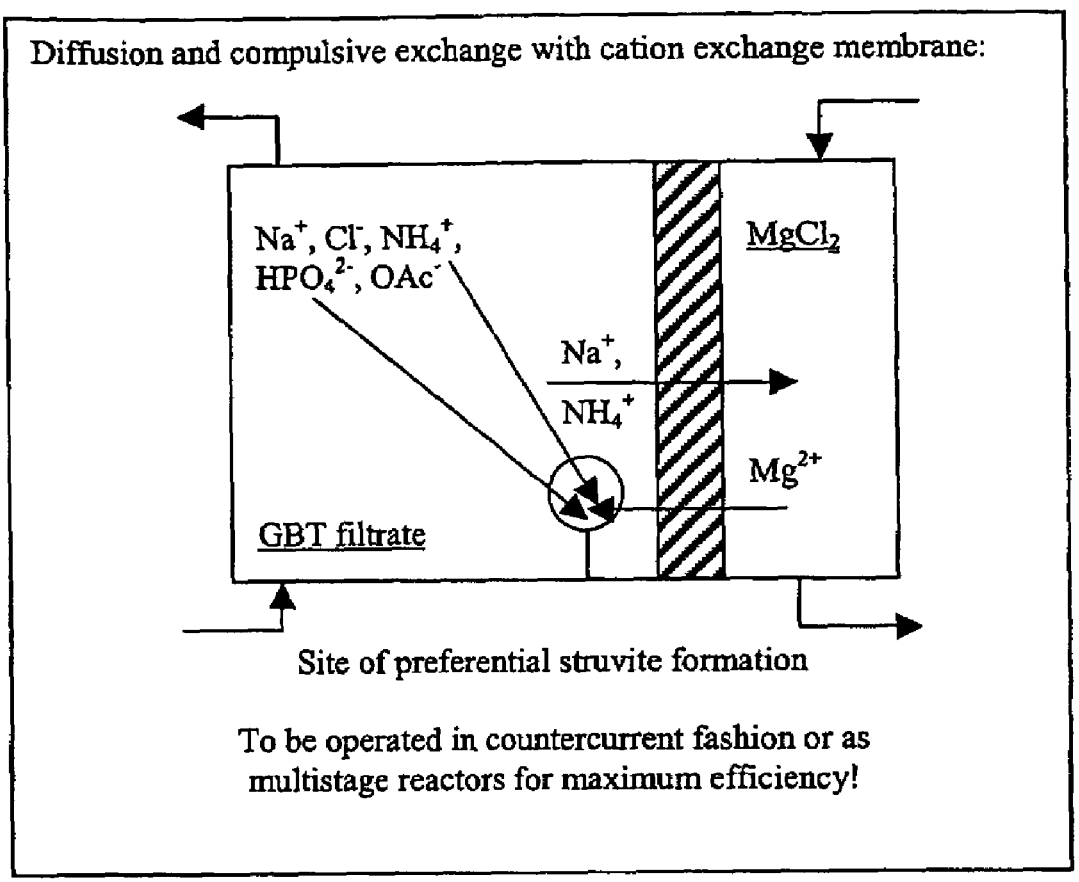
FIG. 9 illustrates a process according to the invention which employs countercurrent or multi-stage reactors to bring together (across the membrane) fresh filtrate with spent magnesium brine and, at an opposing end, largely struvite-stripped filtrate with fresh magnesium brine, so as to maximize efficient use of magnesium and optimal removal of struvite from wastewater.

In particular, as depicted in FIG. 9, the process disclosed herein may be employed as countercurrent or multi-stage reactors to bring together (across the membrane) fresh filtrate with spent magnesium brine and, at the other end of the process, largely struvite-stripped filtrate with fresh magnesium brine across a membrane, so as to maximize efficient use of magnesium and optimal removal of struvite from wastewater. Also, experiments were conducted on dynamic flow of synthetic filtrate into the reactor and out into collection vessels, with a hydraulic retention time of one hour. Struvite crystallization was noted in the collection vessels but not on the membrane, indicating that Mg was supplied by the reactor but the flux of Mg across the membrane could not maintain a Mg-saturated membrane surface in the face of such high Mg demand. This was a validation of the significance of the fact that directed and accelerated struvite formation occurred on a negatively-charged membrane, charged with magnesium.

Figure 10:
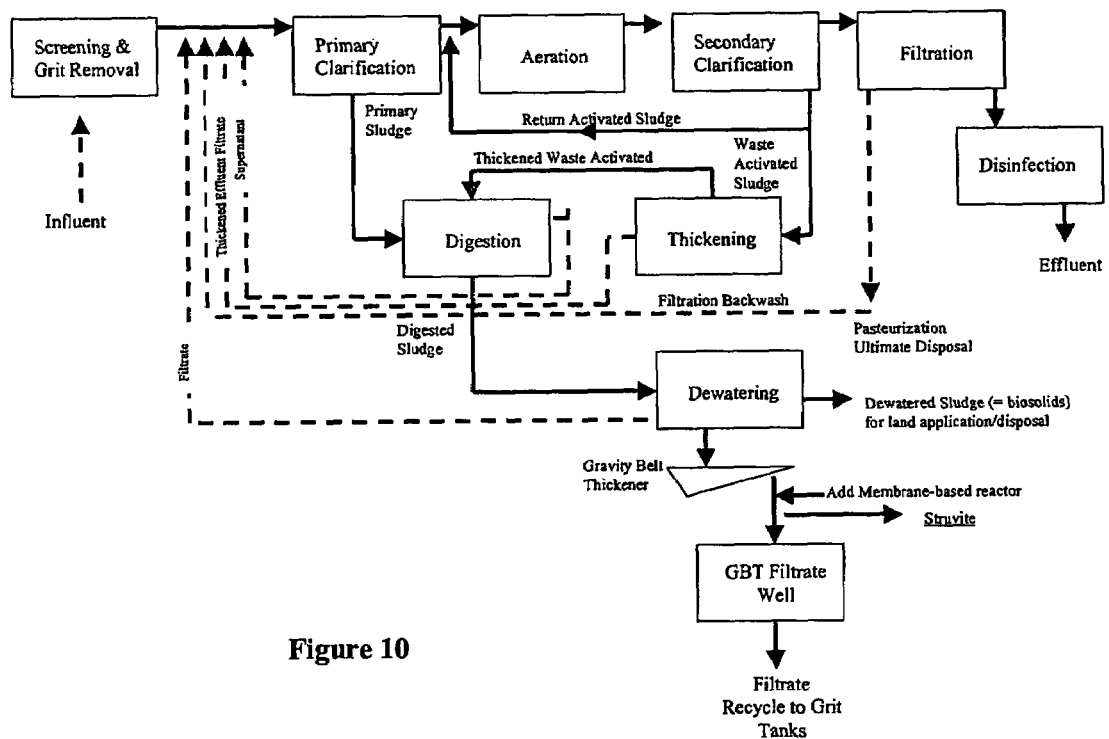
FIG. 10 is a schematic representation of one preferred embodiment of the present invention wherein primary and secondary struvite removal occurs using a polymeric membrane and a monomolecular membrane, respectively.

Another embodiment of the present invention is directed to removal of phosphorus from phosphorus containing sewage in a typical sewage treatment plant, as shown in FIG. 10. There are various processes that are implemented to remove phosphorus from the sewage, including dewatering, passing the sewage through a gravity belt thickener (GBT) or centrifuge and separating the resultant as filtrates that are collected in GBT Filtrate wells or centrifuge liquor wells and as dewatered sludge or biosolids for land application and disposal. Typically most sewage is separated as sewage filtrates and biosolids. The removal of phosphorus as struvite occurs in two stages as primary and secondary removal. In the primary removal process, the sewage from GBT or Centrifuge is contacted with a first polymeric membrane reactor and the phosphorus is removed as primary struvite. In the secondary removal process, the sewage from GBT Filtrate well or Centrifuge Liquor well is contacted with a second monomolecular membrane and the phosphorus is removed as secondary struvite. Since the GBT Filtrate well or Centrifuge Liquor well is a tank that of relatively calm solution; after going through the first polymeric membrane based reactor and picking up magnesium, one of ordinary skills in the art can envision floating the monomolecular membrane at the top of the tank to scrub more struvite crystallization before the well contents are recycled. Additionally more phosphorus may be removed from the sewage biosolids by contacting biosolids with ferric chloride and precipitating phosphorus from them.

Once the sewage filtrate had undergone treatment in the polymer-membrane-based reactor and Mg has been added to make the solution supersaturated with struvite, the Mg-enriched solution could be subsequently treated with the monomolecular membrane in a tank (as in the GBT filtrate well or Centrifuge Liquor well), to complete the stripping of struvite from solution. The monomolecular membrane could also be added to any of those existing struvite crystallization schemes adding $MgCl_2$ or $Mg(OH)_2$ to speed the struvite crystallization and enhance the crystal size. Struvite-scrubbed filtrates or liquors can then be recycled into the sewage treatment process.

Further, when the gravity belt thickener (GBT) filtrate from the Madison Nine Springs sewage treatment plant was run through the diffusion cell used previously with a hydraulic retention time of one hour, the inventors found that struvite formation occurred on the outlet tube, but not on the Ionics membrane separating the filtrate from the magnesium chloride source. Struvite formed on the membrane when the hydraulic retention time was four hours. The inventors also procured a number of sulfonate-type and perfluorosulfonate membranes to substitute for the 'Ionics' membrane, with the goal to achieve both Mg-enrichment and nucleation of struvite crystallization on the same membrane. In other experiments, the inventors determined that 2 mL toluene per liter of filtrate or 2 mM sodium azide is sufficient to act as a biostatic agent against profuse biological activity in the filtrate, which is ~50 mM ammonium acetate.

EXAMPLE III

In another aspect of the invention, experiments using compressed monomolecular layers of alkyl sulfate and alkyl sulfonates showed the same accelerating effects on struvite crystallization as found earlier for stearate (an alkyl carboxylate). Use of toluene instead of chloroform as a stearate solvent produced similar results as before. Taken as a whole, these experiments confirmed that the accelerating factor for struvite formation was the presence of a negatively-charged surface on which struvite may nucleate. This formation was not an artifact of the solvent or a particular charged group. Further microscopy demonstrated repeatedly that the struvite crystals formed were highly symmetrical and quite different in size and shape from those that nucleated on random dust particles.

In an attempt to better visualize the plane of crystallization of struvite on the monolayer, the inventors initiated experiments to form monolayers at solid/liquid interfaces instead of liquid/air interfaces as previously. The inventors first used elemental copper (as copper-clad circuit boards) derivatized with mercapto-undecanoic acid [$HS(CH_2)_{10}COOH$] to form a 'self-assembling monolayer' (SAM); when in contact with struvite-saturated solutions, highly-ordered struvite crystals formed immediately on the surface. Microscopic examination by reflected light suggested that the 2 mm crystals were forming with the 001 plane next to the monolayer. Subsequent formation of SAMs with 10-nm (transparent) gold-coated glass slides and examination using transmitted light confirmed the plane of orientation. The finding that the plane of crystallization is the 001 plane is significant to the claim because this orientation only in the struvite structure has planes of Mg, ammonium, and phosphate stacked in layer form. Any other orientation would be difficult to explain in terms of cation condensation next to a negatively-charged surface. Furthermore, these results are significant because construction of solid/liquid monolayers allows greater freedom of placement in solution than the liquid/air monolayers. Candidates for derivitization likely include other chalcolithic elements such as Cd and Zn.

Generally, crystal formation typically depends upon the presence of nucleation seeds, the nature of which strongly determines the rate and progress of crystallization. Particularly interesting is the observation that rapid agitation favors struvite formation (Ohlinger et al., 1999) yet it can be formed quiescently by contact with bacterial membranes (Gonzalez-Munoz et al., 1996). The inventors hypothesized and discovered that negatively-charged monolayers of the type used by Langmuir and the more modern, but functionally similar, self-assembling membranes might serve as nucleating surfaces that would direct and accelerate struvite precipitation in supersaturated quiescent solutions, as shown in the following paragraphs.

Preparation of Supersaturated Solutions: Stock solutions were prepared from analytical grade $MgSO_4.7H_2O$ and $NH_4H_2PO_4$ and nanopure water and were passed through a 0.45 μm membrane filter (Millipore Corp., Bedford, Mass.) immediately before mixing equimolar solutions supersaturated with respect to struvite. Based on the struvite solubility product of Abbona et al. (1982) and stability constants of Smith and Martell (2001), struvite was considered saturated at 4.12 mM $Mg^{2+}=NH_4^+=H_xPO_4^{3-x}$ at pH 7.5, 298 K; supersaturation ratios, $S_a$ (Ohlinger et al., 1999), were calculated correspondingly.

Crystallization under Compressed Langmuir Monolayers: Compressed films were formed by adding known amounts of surfactants dissolved in volatile solvents to rigorously cleaned 60×15 mm glass Petri dishes containing supersaturated solutions. Stearic acid was dissolved in a volatile organic solvent (chloroform, toluene, or benzene) at a concentration of 1 mg/mL and an amount sufficient equivalent to the limiting areas per molecule, 24 Å$^2$ for stearate (for pH>p$K_a$=5.6; Rajam et al., 1991; Fluka), was pipetted onto the solution surface. In a similar manner, other surfactants, among them octadecyl sodium sulfate (Sigma-Aldrich, St. Louis, Mo.), and octadecyl sodium sulfonate (Research Plus Inc., Manasquan, N.J.), were dissolved in 50% isopropanol: water and dispensed into the Petri dishes.

The behavior of compressed monolayers over supersaturated solutions under quiescent and dust-free conditions was followed with time lapse photography and the first appearance of a crystal in the Petri dish was determined.

Figure 11:
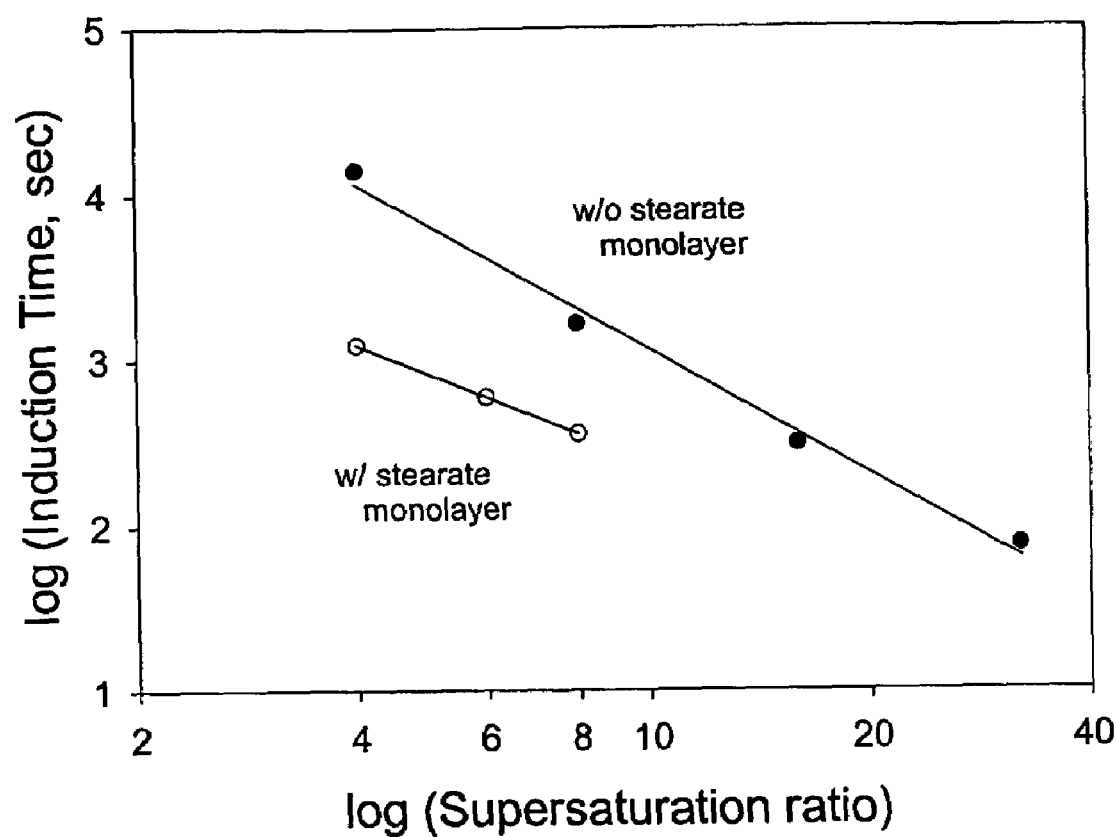
FIG. 11 illustrates nucleation and crystallization times for quiescent supersaturated solutions, as observed by time lapse photography.
Figure 12:
FIG. 12 illustrates micrograph of struvite crystals (top) that sloughed off the compressed stearate monolayer after forming from a $S_a$=4 solution and (below, at higher magnification) those that formed in the absence of stearate monolayer.

Struvite crystallization under compressed Langmuir monolayers: In a preferred embodiment, the presence of compressed stearate monolayers on the supersaturated solutions reduced the crystallization time by an order of magnitude within the range of supersaturation ratios tested (FIG. 11). The struvite crystals that were formed under stearate over longer periods of time, ~1 hr, were observed to peal off the solution surface and fall to the bottom of the Petri dish; such crystals were generally well-formed and symmetrical, and between 0.5 and 2 mm in length (FIG. 12). Similar struvite crystals were formed under octadecyl sulfate and octatdecyl sulfonate monolayers and crystallization times were similar to those of stearate. In the absence of a compressed, negatively-charged monolayer, those struvite crystals that did form were much smaller by comparison, often stellar in shape with dust particles as the apparent nucleation site.

Crystallization on Self-Assembling Monolayers (SAMs) and Struvite crystallization on negatively-charged self-assembling monolayers: In a preferred embodiment, SAMs were prepared with 11-mercaptoundecanoic acid (Aldrich) and either copper or gold substrates. One of ordinary skill in the art may appreciate that other elements may be used without departing from the spirit of the invention. Therefore, other gold-like or copper-like chalcophilic elements such as Cu, Ag, Zn, Cd, Ga, In, Tl, Pb, Hg or Bi or siderophilic elements such Au, Ge, Sn, Ni, Pd or Pt may also be used. In one preferred embodiment, the copper substrate was commercially-available copper-clad circuit board, 0.0014" copper on a fiberglass core; before use, the copper was thoroughly cleaned using commercial copper polish ('Brasso'; Reckitt & Colman Inc., Wayne, N.J.) and rinsed in petroleum spirits. The gold substrate was an optically-transparent gold-coated microscope slide (obliquely deposited, 100 Å Au over a Ti adhesion layer; Platypus Technologies, Madison, Wis.) Substrates were derivatized by immersion overnight in 0.01 M 11-mercaptoundecanoic acid (Aldrich) in ethanol, then rinsed in ethanol and blown dry before being immersed in a Petri dish of supersaturated solution. After ~1 hr, the SAMs were removed from the solutions and crystals were examined by light microscopy. The gold-substrate was oriented in the struvite-supersaturated solution with the SAM facing up and the resulting struvite crystals were imaged as a z-stack on an Olympus microscope; the crystal face adjacent to the SAM was identified by comparison with Abbona et al. (1984).

Overall, in the absence of nucleating surfaces, solutions that were supersaturated with respect to struvite did not immediately form struvite crystals. For example, the solution with the supersaturation index, $S_a$, of 4 was metastable for more than 3 hrs (FIG. 11), even though it was 64× more saturated ($=4^3$) than the solubility product of struvite, and was therefore chosen for many of the subsequent struvite crystallization studies.

The self-assembling monolayers (SAMs) used here strongly resemble the compressed Langmuir monolayers because, although they were constructed by reacting thiol groups with a suitable solid metal substrate to create a highly ordered and dense array of hydrocarbons, the terminal group of which is a carboxylate group like that of stearate. Whereas the compressed stearate monolayers must be floated on the liquid-air interface and therefore crystals are difficult to recover on the monolayer, the SAMs permit more convenient positioning of the nucleating surface in the supersaturated solution.

Figure 13:
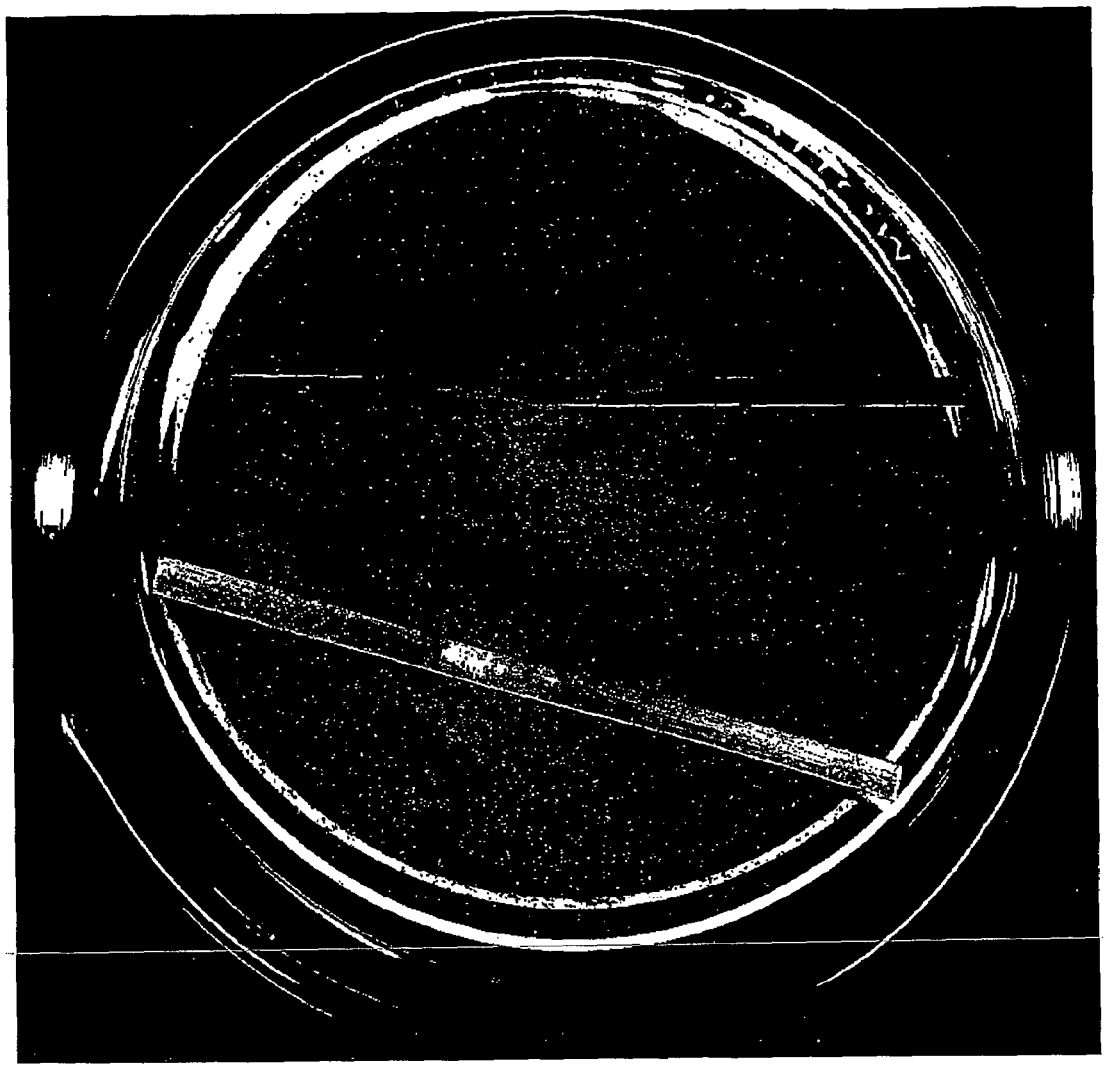
FIG. 13 illustrates the Struvite crystals formed on the mercaptoundecate-derivatized copper and sloughed off to the bottom of the Petri dish; formed from a $S_a$=4 solution.
Figure 14:
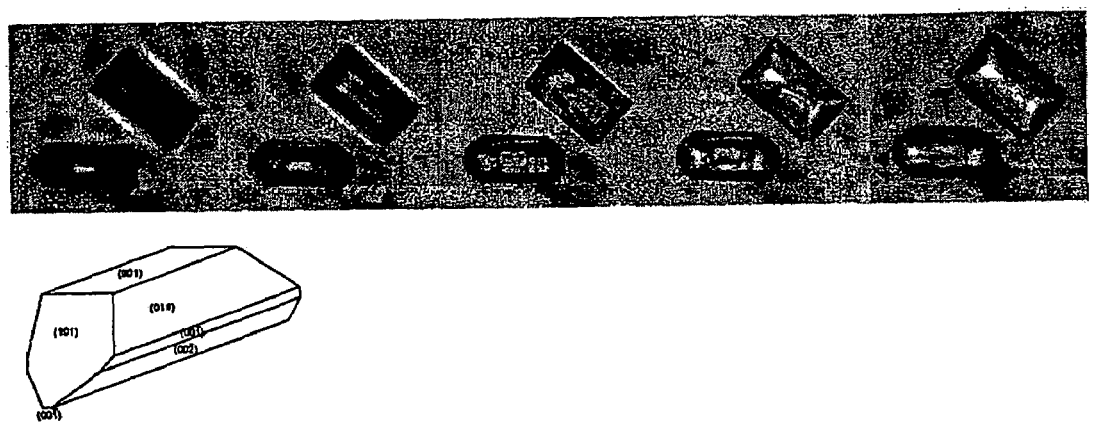
FIG. 14 illustrates selected frames of a z-stack of struvite crystals that formed on a SAM with a mercaptoundecate-derivatized, optically transparent gold substrate. The series progresses from the SAM, the leftmost frame, in which the rectangular {001} face is in focus, to 106 µm above the SAM. The larger crystal is 0.6 mm in length. Compare with the clinographic projection of struvite (below.

Struvite crystals formed rapidly on the derivatized copper SAM; if the SAM was oriented upward, the object was not suitable for transmitted light microscopy and if oriented sideways or downward, the struvite crystals sloughed off the SAM and settled on the Petri dish adjacent to the SAM (FIG. 13). Struvite crystals formed on SAM on the optically-transparent gold substrate that was oriented upward; subsequent transmitted light microscopy showed the {001} crystal face adjacent to the SAM (FIG. 14). Crystal growth in this orientation with the negatively-charged surface is apparently favored because it is a well developed crystal face among struvite crystals formed in solution alone (Abbona et al., 1984) and because it is the only common struvite crystal face (among {011}, {101}, {012}, and {011} that has the various ionic constituents—$NH_4^+$, $PO_4^{3-}$, and $Mg^{2+}$—arranged in consecutive homogenous layers.

Figure 15:
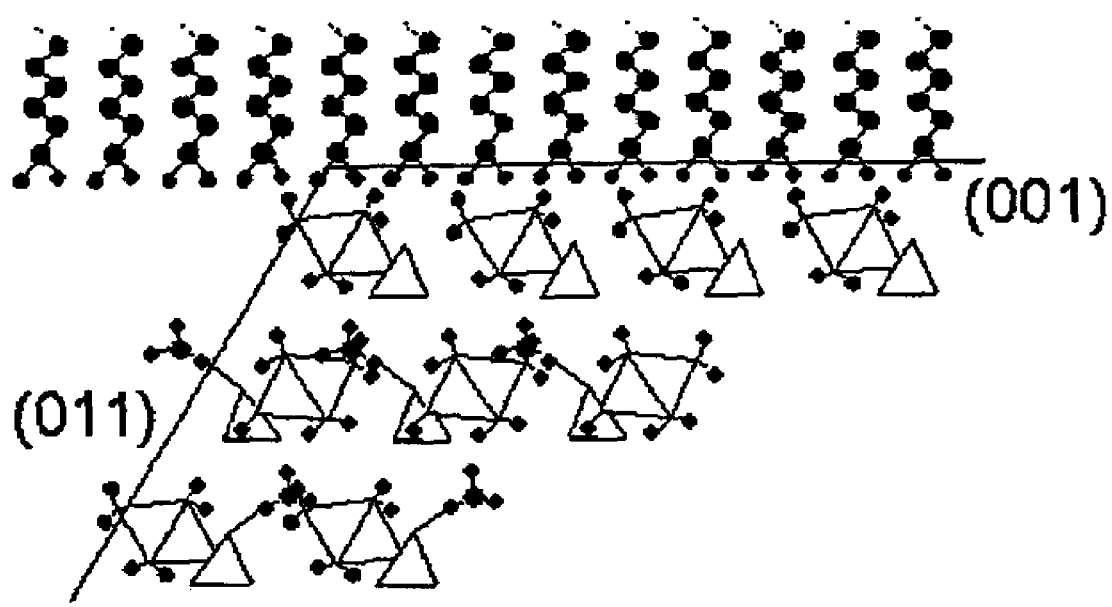
FIG. 15 Proposed orientation of struvite {001} crystal face on the negatively-charged monolayer, whether compressed or self-assembled, drawn with $Mg^{2+}$ as the most likely cation adjacent to the negatively-charged surface, as a projection down the x-axis of the structure.

No direct evidence is available as to which of the three ionic constituent layers on the {011} face immediately adjoins the negatively-charged carboxylate SAM surface. However, phosphate can be ruled out because of its negative charge is repelled by the carboxylate surfaces. Of the two cationic constituents of struvite, $NH_4^+$ and $Mg^{2+}$, under conditions of equal concentration in solution, as here, the negatively-charged surface likely prefers $Mg^{2+}$ over $NH_4^+$ by because of its higher charge. Furthermore, the a×b cell dimensions of the {001} crystal face are 6.955 Å×6.142 Å (Abbona et al., 1984) and therefore the density of $Mg^{2+}$ ion on the {001} face is 42.7 $Å^2$ per $Mg^{2+}$, or 21.3 $Å^2$ per ½ $Mg^{2+}$. The charge density of the $Mg^{2+}$ surface of {001} very nearly matches the limiting area per stearate molecule, 24 $Å^2$, in compressed Langmuir monolayers and suggests that the stearate monolayer and SAMs have acted as a molecular template for the organizing the $Mg^{2+}$ ($H_2O)_6$ layer of the struvite crystal, beginning with the {001} face. Following this scheme, the $PO_4^{3-}$ layer then forms on the $Mg^{2+}(H_2O)_6$ layer, followed by $NH_4^+$, with the crystal increasing in width in both the x and y directions as the {001} and {101} crystal faces as the crystal grows in the z dimension (FIG. 15). If struvite crystallizes in this manner, then it follows that the isomorphous minerals, $MgKPO_4.6H_2O$, the potassium analog of struvite, $MgNH_4AsO_4.6H_2O$ and selenstruvite, $MgNH_4SeO_4.6H_2O$, might form similarly, as well as the potash ore carnallite, $KMgCl_3.6H_2O$, or Picomerite $K_2Mg(SO_4)_2.6H_2O$ which, like struvite, has a $Mg^{2+}(H_2O)_6$ layer.

Conclusion: Work by Heywood and Mann (1988, 1993) with crystallization utilizing monomolecular membranes using a variety of lipids and functional groups, among them stearic acid ($CH_3(CH_2)_{16}CO_2H$), octadecylamine ($CH_3(CH_2)_{17}NH_2$), octadecanol ($CH_3(CH_2)_{17}OH$), and cholesterol ($C_{27}H_{45}OH$), under full and partial compression (Mann et al., 1993), produced striking results by inducing the oriented formation of vaterite, a rare polymorph of $CaCO_3$, in calcium bicarbonate systems that otherwise crystallized calcite. Work with $CaCO_3$ was focused on the structural and stereochemical relationship between the monolayers and controlled nucleation of $CaCO_3$ using monolayers (Mann et al., 1993). With the successful crystallization of struvite by this monomolecular technique, the inventors' work appears to be the first to crystallize any magnesium salt and the first double salt of any kind. Furthermore, the crystal size was remarkably large compared to those others produced by this technique, likely due to the close match in charge density between the negatively-charged surface and the hydrated magnesium layer of the corresponding crystal face.

Overall, various embodiments of the present invention may have many other applications aside from those listed here. Thus, although the invention has been shown and described here in what is perceived to be the most certain and preferred embodiments and examples, it is to be understood that the invention is not intended to be limited to the specific embodiments and examples set forth above. Rather, it is recognized that certain modifications, substitutions, alterations, omissions may be made by one of skill in the art of the invention without departing from the spirit or intent of the invention. For instance, while the EXAMPLES I, II and III contained in the present invention in particular describe removal of waste phosphorus from sewage plants, the present method is applicable for removal of phosphorus and other minerals from any other bodies, liquids and solids, such as lakes, manures, urine, and other known and yet to be known phosphorus, magnesium, potassium, ammonium or selenium sources, as one of skill in the art after reviewing the present disclosure will appreciate. Accordingly, the invention is to be taken as including all reasonable equivalents to the subject matter of the appended claims and the foregoing description is meant to be exemplary only and should not limit the scope of the invention set forth in the following claims.

REFERENCES

Barak, P. 1990. SPECIES: A spreadsheet program for modeling speciation of soil solution. J. Agron. Educ. 19:44–46. (http://www.soils.wisc.edu/~barak/species.htm)

Gonzalez-Munoz, M. T., N. BenOmar., M. Martinez-Canamero., M. Rodriguez-Gallego., A. L. Galindo., and J. M. Arias. 1996. Struvite and calcite crystallization induced by cellular membranes of *Myxococcus xanthus*. J. Cryst. Growth 163:434–439.

Mann, S., D. D. Archibald., J. M. Didymus., T. Douglas., B. R. Heywood., F. C. Meldrum, and N. J. Reeves. 1993. Crystallization at inorganic-organic interfaces-biominerals and biomimetic synthesis. Science 261:1286–1292.

Ohlinger, K. N., T. M. Young., and E. D. Schroeder. 1999. Kinetics effects on preferential struvite accumulation in wastewater. J. Environ. Eng. 125:730–737.

Pierzynski, G. M., J. T. Sims., and G. F. Vance. 2000. Soils and Environmental Quality. 2nd ed. CRC Press, Boca Raton, London, New York, Washington D.C.

CEEP, Comite Europeen d'Etudes des Polyphosphates. (2001) Conference Summary; Second Int'l Conf. on the recovery of phosphorus from sewage and animal wastes. Noordwijkerhout, The Netherlands. 12&13 Mar., 2001. 20 pp.

(http://www.nhm.ac.uk/mineralogy/phos/conferencesummary.pdf)

Jaffer, Y., T. A. Clark, P. Pearce, and S. A. Parsons. 2002. Potential phosphorus recovery by struvite formation. Water Research 36:1834–1842.

Münch, E. V., A. Benesovsky-Scott, J. Josey, and K. Barr. Undated. Making a Business from Struvite Crystallization for Wastewater Treatment: Turning Waste into Gold [Online]

http://www.nhm.ac.uk/mineralogy/phos/Nordwijkerhout/VonMunch.doc (verified Jul. 25, 2003).

Liberti, L., D. Petruzzelli, and L. De Florio. 2001. REM NUT ion exchange plus struvite precipitation process. Environmental Technology 22:1313–1324.

Rawn, A. M., Banta, A. P., Pomeroy, R. 1939. Multiple stage sewage digestion. Trans. Am. Soc. Civil Eng. 105: 93–132.

Rajam, S., B. R. Heywood, S. Mann. 1991. Oriented crystallization of CaCO3 under compressed monolayers. Part 1. —Morphological studies of mature crystals. J. Chem. Soc.-Faraday Trans. 87:727–734

Taylor, A. W., Frazier, A. W., Gurney, E. L., Smith, J. P. 1963. Solubility products of magnesium ammonium and magnesium potassium phosphates. Trans. Faraday Soc. 5(9): 1585–1589.

Abbona, F., Lundager Madsen, H. E., and Bolistelle, R. 1982. J. Cryst. Growth 54:6–14.

Abbona, F., Calleri, M., and Ivaldi, G. 1984. Synthetic struvite, MgNH4PO4.6H2O: Correct polarity and surface features of some complementary forms. Acta Cryst. B40: 223–227.

Jaffer, Y., T. A. Clark, P. Pearce, and S. A. Parsons. 2002. Potential phosphorus recovery by struvite formation. Water Research 36:1834–1842.

Liberti, L., D. Petruzzelli, and L. De Florio. 2001. REM NUT ion exchange plus struvite precipitation process. Environmental Technology 22:1313–1324.

Mann, S., D. D. Archibald., J. M. Didymus., T. Douglas., B. R. Heywood., F. C. Meldrum., and N. J. Reeves. 1993. Crystallization at inorganic-organic interfaces—biominerals and biomimetic synthesis. Science 261:1286–1292.

Mann, S., B. R. Heywood, S. Rajam, and J. D. Birchall. 1988. Controlled crystallization of CaCO3 under stearic-acid monolayers. Nature 334:692–695.

Ohlinger, K. N., T. M. Young., and E. D. Schroeder. 1999. Kinetics effects on preferential struvite accumulation in wastewater. J. Environ. Eng. 125:730–737.

Rajam, S., B. R. Heywood, J. B. A. Walker, and S. Mann. 1991. Oriented crystallization of CaCO3 under compressed monolayers. Part 1.—Morphological studies of mature crystals. J. Chem. Soc. Faraday Trans. 87:727–734.

Smith, R. M., and Martell, A. E. 2001. NIST critically selected stability constants of metal complexes, version 6.0. U.S. Dept. of Commerce, National Institute of Standards and Technology, Standard Reference Data Program, Gaithersburg, Md. [electronic resource]

Tantinirundr, U. 2000. Phosphorus removal in an aerobic supernatant by struvite crystallization without addition of chemicals. Masters, University of Wisconsin, Madison.

Gonzalez-Munoz, M. T., N. BenOmar., M. Martinez-Canamero., M. Rodriguez-Gallego., A. L. Galindo., and J. M. Arias. 1996. Struvite and calcite crystallization induced by cellular membranes of *Myxococcus xanthus*. J. Cryst. Growth 163:434–439.

The invention claimed is:

1. A method of removing phosphorus from phosphorus containing waste, comprising the steps of: (a) contacting the phosphorus containing waste with a membrane; and (b) precipitating phosphorus from the waste as struvite,
    wherein the membrane is negatively charged and is organized as a monolayers, micelles, lamellar bilayers or bilayer vesicles.

2. A method according to claim 1 wherein the membrane is a "self-assembling monolayer" ("SAM").

3. A method according to claim 1 wherein the SAM is formed through a mercapto-derivatized chalcophilic or siderophilic element compound.

4. A method according to claim 3 wherein the chalcophilic or siderophilic element is selected from Cu, Ag, Zn, Cd, Ga, In, Tl, Pb, Hg, Bi, Au, Ge, Sn, Ni, Pd and Pt.

5. A method according to claim 3 wherein the mercapto-derivatized chalcophilic or siderophilic element compound is copper or gold derivatized with mercapto-undecanoic acid, $[HS(CH_2)_{10}COOH]$.

6. A method according to claim 5 wherein struvite is further nucleated as crystals on copper or gold derivatized with mercapto-undecanoic acid, $[HS(CH_2)_{10}COOH]$.

7. A method according to claim 6 wherein the struvite crystallization occurs along a 001 plane, and wherein the struvite structure has planes of Ammonium 1, Magnesium 2 and Phosphate 3 stacked in layers of 2-3-1-2-3-orientation.

8. A method according to claim 1 wherein the monomolecular membrane has a hydrophobic tail having an acyl chain of 8–24 carbon lengths, and a hydrophilic head group.

9. A method according to claim 8 wherein the head group is selected from the group consisting of sulfonic acid, carboxylate, sulfate, sulfonate, perfluorosulfonate, phosphate, phosphonate and alcohol.

10. A method according to claim 1 wherein the acyl chain is saturated, unsaturated or esterified.

11. A method according to claim 1 wherein the carboxylic acid is selected from the group consisting of stearic acid, stearyl sulfate, stearyl sulfonate, stearyl phosphate, stearyl phosphonate and stearyl alcohol.

12. A method according to claim 1 wherein the phosphorus containing waste has a pH between 7 and 14.

13. A method according to claim 1 wherein the phosphorus containing waste has a pH between 8 and 10.

14. A method according to claim 1 further comprising the step of adding ferric chloride to the phosphorus containing waste and precipitating phosphorus.

15. A method according to claim 1 wherein the phosphorus containing waste is selected from the group consisting of biosolids, bioliquids, water bodies, solutions, colloids and precipitates.

16. A method of removing phosphorous from phosphorous containing waste, comprising the steps of (a) contacting the phosphorous containing waste at one side of a cation exchange membrane, contacting the other side of the membrane with a magnesium containing solution, passing the magnesium through the membrane to the waste containing phosphorous; (b) and precipitating the phosphorous from the waste as struvite;

wherein the membrane is a polymeric membrane selected from the group consisting of negatively charged sulfonic acid, carboxylate, sulfate, sulfonated, perfluorosulfonate, phosphate, phosphonate and alcohol and combinations thereof, embedded in a nylon or acrylic membrane.

17. An apparatus for removing phosphorus from phosphorus containing waste, comprising:
   a first chamber containing phosphorus containing waste;
   a second chamber containing suitable magnesium ionic salts and solutions;
   a cation exchange membrane separating the first and second chambers, wherein the membrane is held and sealed between the first and second chambers and wherein the membrane is a polymeric acrylic membrane containing functional groups selected from the group consisting of sulfonic acid, carboxylate, sulfate, sulfonate, perflourosulfonate, phosphate, phosphonate and alcohol.

18. An apparatus according to claim 17 wherein suitable ionic salts and solutions selected from the group consisting of $MgCl_2$, $MgO$, $Mg(OH)_2$, $Mg(O_2CCH_3)_2$ and $MgSO_4$.

19. An apparatus according to claim 17 wherein has no freshly added phosphorus containing waste and wherein has no freshly added ionic salts and solutions.

20. An apparatus according to claim 17 wherein has freshly added phosphorus containing waste and the second chamber has freshly added ionic salts, optionally as countercurrents, whereby direction of addition of fresh phosphorus containing waste is opposite to the direction of addition of fresh ionic salt and solutions.

21. An apparatus according to claim 17 wherein fresh phosphorus containing waste and spent ionic salts and solutions are added at one end and substantially struvite stripped phosphorus containing waste and fresh ionic salts and solutions are added at an opposing end, thereby forming a multistage reactor.

22. A method of removing phosphorous from phosphorous containing sewage including filtrate and biosolids comprising the steps of:
   (a) contacting the sewage at one side of a cation exchange membrane reactor, contacting the other side of the membrane with a magnesium containing solution, passing the magnesium through the membrane to the sewage containing phosphorous; (b) and precipitating the phosphorous from the waste as primary struvite;
   (b) adding Mg to make the sewage supersaturated with struvite; and
   (c) contacting the supersaturated sewage with a monomolecular membrane and removing phosphorous as secondary struvite.

23. A method according to claim 22 wherein the polymeric membrane is selected from the group consisting of a negatively charged nylon polymeric membrane and negatively charged acrylic polymeric membrane.

24. A method according to claim 22 wherein the monomolecular membrane is selected from the group consisting of stearic acid membrane, stearyl sulfate membrane, stearyl sulfonate membrane, stearyl phosphate membrane, stearyl phosphonate membrane and stearyl alcohol membrane.

25. A method according to claim 22 wherein the phosphorus containing sewage has a pH between 8–10.

26. A method according to claim 22 further comprising the step of contacting sewage biosolid with ferric chloride and precipitating phosphorus.

27. A method according to claim 22 wherein the phosphorus containing sewage has passed through at least a dewatering unit, GBT, GBT Filtrate Well, Centrifuge, or Centrifuge Well prior to removal of phosphorus by said method.

28. A method of removing phosphorus, potassium, ammonium, magnesium, selenium or arsenic from waste containing phosphorus, potassium, ammonium, magnesium, selenium or arsenic, comprising the steps of:
   (a) contacting the waste with a membrane; and
   (b) precipitating phosphorus, potassium, ammonium, magnesium, selenium or arsenic from the waste as struvite and at least an analog thereof,
wherein the membrane is negatively charged and is organized as monolayers, micelles, lamellar bilayers or bilayer vesicles.

29. A method according to claim 28 wherein the membrane is a "self-assembling monolayer" ("SAM").

30. A method according to claim 29 wherein the SAM is formed through a mercapto-derivatized chalcophilic or siderophilic element compound.

31. A method according to claim 30 wherein the chalcophilic or siderophilic element is selected from Cu, Ag, Zn, Cd, Ga, In, Tl, Pb, Hg, Bi, Au, Ge, Sn, Ni, Pd and Pt.

32. A method according to claim 28 wherein struvite analog is $MgKPO_4.6H_2O$, $MgNH_4AsO_4.6H_2O$, $MgNH_4SeO_4.6H_2O$, $KMgCl_3.6H_2O$, or $K_2Mg(SO_4)_2.6H_2O$.

* * * * *